United States Patent [19]

Tanioka et al.

[11] Patent Number: 5,177,795
[45] Date of Patent: Jan. 5, 1993

[54] IMAGE PROCESSING APPARATUS

[75] Inventors: Hiroshi Tanioka, Tokyo; Yoshitaka Ogino, Kawasaki, both of Japan

[73] Assignee: Canon Kabushiki Kaisha, Tokyo, Japan

[21] Appl. No.: 758,211

[22] Filed: Sep. 12, 1991

Related U.S. Application Data

[63] Continuation of Ser. No. 287,627, Dec. 20, 1988, abandoned, which is a continuation of Ser. No. 925,247, Oct. 31, 1986, abandoned.

[30] Foreign Application Priority Data

Nov. 5, 1985 [JP] Japan .................................. 60-246204
Nov. 5, 1985 [JP] Japan .................................. 60-246205
Nov. 5, 1985 [JP] Japan .................................. 60-246206

[51] Int. Cl.$^5$ .............................................. G06K 9/38
[52] U.S. Cl. ....................................... 382/50; 382/54; 358/450; 358/462; 358/460
[58] Field of Search ................. 382/50, 51, 54, 27, 382/52, 53; 358/429, 432, 450, 455, 456, 457, 462, 464, 465, 466

[56] References Cited

U.S. PATENT DOCUMENTS

| | | | |
|---|---|---|---|
| 4,083,035 | 4/1978 | Riganati et al. | 382/27 |
| 4,251,837 | 2/1981 | Janeway, III | 358/283 |
| 4,288,779 | 9/1981 | Otsu et al. | 382/27 |
| 4,288,821 | 9/1981 | Lavallee | 358/283 |
| 4,414,581 | 11/1983 | Kato | 358/283 |
| 4,447,830 | 5/1984 | Stoffel | 358/283 |
| 4,495,522 | 1/1985 | Matsunawa | 358/283 |
| 4,506,382 | 3/1985 | Hada et al. | 382/27 |
| 4,517,606 | 5/1985 | Yokomizo | 358/283 |
| 4,663,662 | 5/1987 | Sekijawa | 358/283 |
| 4,668,995 | 5/1987 | Chen | 358/283 |
| 4,709,274 | 11/1987 | Tanioka | 382/50 |
| 4,731,862 | 3/1988 | Tsuda | 382/50 |
| 4,821,334 | 4/1989 | Ogino et al. | 382/50 |
| 4,853,970 | 8/1989 | Ott et al. | 382/27 |

*Primary Examiner*—Joseph Mancuso
*Attorney, Agent, or Firm*—Fitzpatrick, Cella, Harper & Scinto

[57] ABSTRACT

An image processing apparatus has a pixel data input unit, and a processing unit for processing pixel data input from the input unit. The processing unit has a discriminating unit for discriminating an image type of the input pixel data. The discriminating unit has a first discriminator for discriminating the image type of a pixel of interest in a first mode using data of the pixel of interest and pixel data adjacent to the pixel of interest, and a second discriminator for discriminating the image type of the pixel of interest in a second mode different from the first mode. The unit discriminates the image type of the pixel of interest using the discrimination results of the first and second discriminators.

30 Claims, 11 Drawing Sheets

IMAGE PROCESSING APPARATUS

This application is a continuation of application Ser. No. 07/287,627, filed Dec. 20, 1988, which was a continuation of application Ser. No. 06/925,247, filed Oct. 31, 1986 now abandoned.

BACKGROUND OF THE INVENTION

1. Field of the Invention

The present invention relates to an image processing apparatus suitable for a digital copying machine, a facsimile system, a filing system, a personal computer, or the like.

2. Related Background Art

A binary (black and white) dot printer, e.g., a laser beam printer, is known as an image reproducing apparatus. When such a printer is used, a binary processing mode must be switched in accordance with an image type (which means an image characteristic or nature) in order to obtain a high-quality reproduction image.

For example, line images, e.g., characters, must be binarized with high precision using a given threshold value, halftone images, e.g., pictures, must be binarized by a dither method in order to reproduce them with high gradation, and dot images must be binarized by a dither method after a scanned image signal has been temporarily smoothed in order to suppress moire noise.

However, when a normal original in which the above-mentioned three types of images are present at the same time is to be binarized, an image type is discriminated while scanning the image, and the processing mode must be switched in real time in accordance with the discrimination result, thus performing binarization.

In realizing such an apparatus, the size of the necessary hardware becomes considerable, and such an apparatus has not been used in practice yet.

In addition, pictures cannot be subjected to accurate image type discrimination, and are often mistaken for line (character) image when they are not As described above, when a digital image is processed, an apparatus which switches binarizing modes in accordance with an image type (which means an image characteristic or nature) to reproduce a binary image is conventionally known.

When image processing is performed using such an apparatus, two-dimensional smoothing processing of an image is often performed in order to suppress moiré with respect to dot images.

When an image type is discriminated, almost all the processing requires such two-dimensional smoothing processing.

Therefore, a processing circuit of this type requires a memory for storing a plurality of lines of an image, and the entire apparatus becomes complex and expensive. As a result, an inexpensive apparatus cannot incorporate such a means.

SUMMARY OF THE INVENTION

It is an object of the present invention to eliminate the above drawbacks.

It is another object of the present invention to provide an image processing apparatus for obtaining a high-quality reproduction image.

It is still another object of the present invention to provide an image processing apparatus which can accurately reproduce an original image.

It is still another object of the present invention to provide an improvement in an image processing apparatus comprising an image discrimination function.

It is still another object of the present invention to provide an image type processing apparatus which can stably and accurately discriminate an image type.

It is still another object of the present invention to provide an image processing apparatus which can obtain a high-quality reproduction image with a simple arrangement.

It is still another object of the present invention to provide an image processing apparatus which has a compact hardware arrangement and is capable of high speed processing.

It is still another object of the present invention to provide a simple, low-cost image processing apparatus having an image discrimination function.

According to the present invention, these objects are achieved by providing an image processing apparatus having a processing means which processes input pixel data, and comprises a two-dimensional smoothing device which smoothes density levels of a plurality of pixels, including a pixel of interest. A first combination means combine level data of a predetermined cycle without data from the two-dimensional smoothing means. A binarizing means binarizes data for the pixel of interest in accordance with the output from the first combination means. The type of image to which the pixel data of interest pertains is discriminated in accordance with binary data output from the binarizing means.

According to another aspect of the invention, input pixel data is first binarized, after which image type is discriminated in a first mode in accordance with the output binary data, and is also discriminated using a second mode different from the first. The binary data is then selected in accordance with the results of discrimination by the first and second discriminating modes. Preferably, each mode is carried out by a separate discrimination means which operates to discriminate image type for each pixel, using, for example, the data of the pixel of interest and also binarized data for adjacent pixels.

According to another aspect of the invention, pixel data quantized as N-bit data is input, and is then processed. The processing involves operating on the N-bit data and data of a predetermined level to produce n-bit pixel data, where n is less than N but greater than 1. Image type is then discriminated in accordance with the n-bit pixel data.

The above and other objects features and advantages of the present invention will be apparent from the following detailed description of the preferred embodiments taken in conjunction with the accompanying drawings.

DETAILED DESCRIPTION OF THE PREFERRED EMBODIMENTS:

Before explaining an embodiment of the present invention, an image type discrimination apparatus disclosed in U.S. Pat. No. 4,821,334 previously proposed by the present applicants will first be described.

Figure 2:
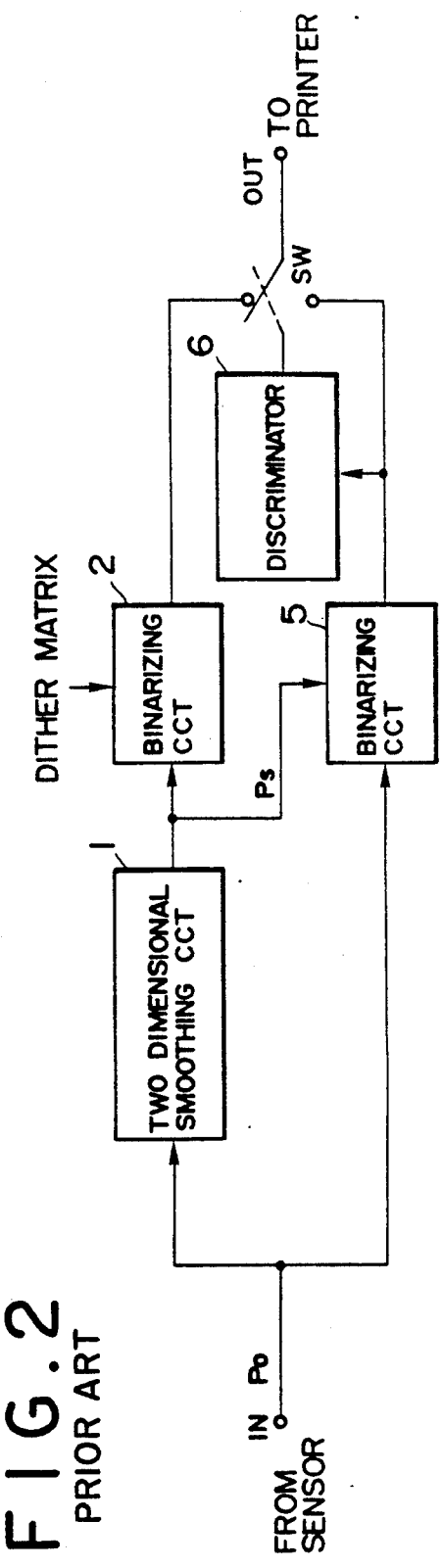
FIG. 2 is a block diagram of an image type discrimination apparatus for explaining the present invention.

FIG. 2 is a schematic block diagram of an image type discrimination apparatus described in U.S. Pat. No. 4,821,334.

In this apparatus, an image signal Po at an input terminal $I_N$ is temporarily smoothed by a two-dimensional smoothing circuit 1 to obtain smoothed data Ps. The scanned original image signal Po is binarized by a binarizing circuit 5 using the smoothed data Ps as a threshold value. Thus, a dot image can be binarized as a dot image signal, and a fine line image can be binarized as a high-precision binary signal.

The obtained binary data has the following characteristics in accordance with its image type.

| Character, line image | constituted by lines succeeding each other in one of two orthogonal directions |
| Dot image | constituted by black or white independent dots having a high spatial frequency in both the two orthogonal directions |
| Picture image | constituted by almost random black or white dots |

A discriminator 6 receives the binary signal output from the binarizing circuit 5 and detects the above characteristics for a predetermined area surrounding a pixel of interest, thus performing image type discrimination with a minimum size of hardware.

However, the apparatus shown in FIG. 2 cannot stably discriminate an image type with respect to picture images for the following reasons.

(1) When a halftone area having a uniform density is scanned by an image scanning system having high reliability, randomly independent dots do not appear in a binary image P.

(2) When a uniform density area is scanned by a normal image scanning system, it may be identified as a fine line binary image due to variations in sensitivity of a sensor.

In this manner, the halftone image is partially erroneously recognized as a character or line image, resulting in a noisy reproduction image.

Figure 1:
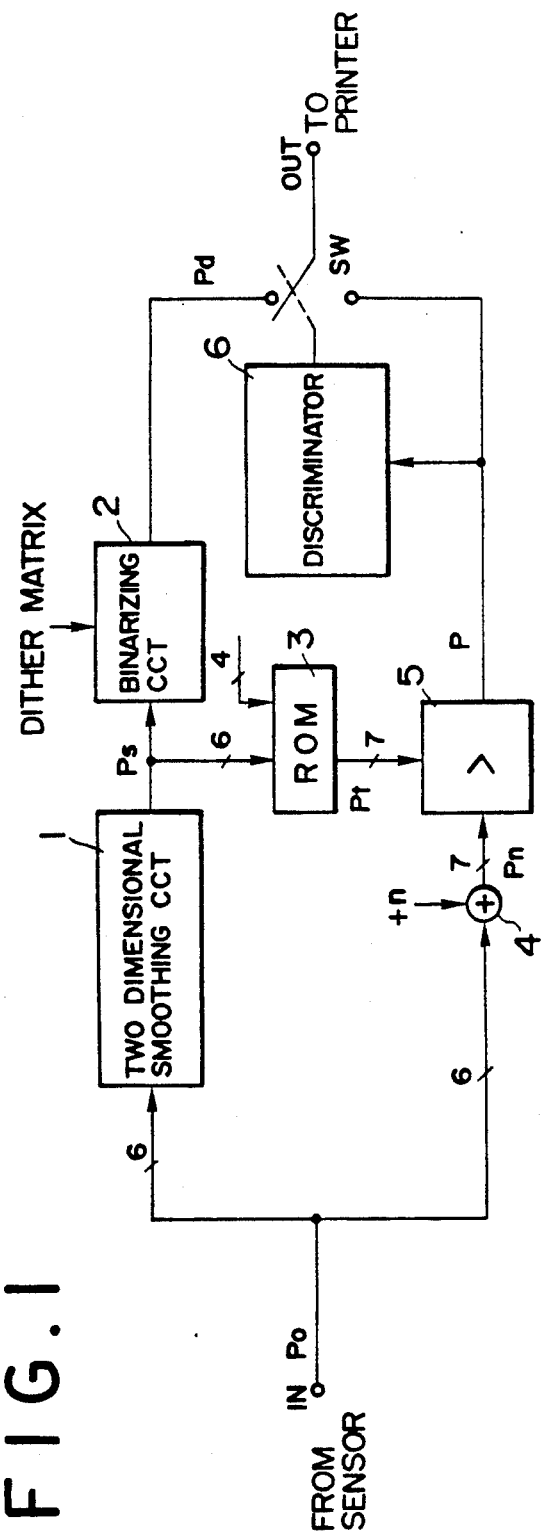
FIG. 1 is a block diagram of an image processing apparatus according to an embodiment of the present invention.

In the first preferred embodiment of the present invention, in order to eliminate the above two types of error, the arrangement shown in FIG. 1 is adopted. Note that the same reference numerals in FIG. 1 denote parts having the same functions as in FIG. 2.

FIG. 1 is a block diagram showing an embodiment of the present invention. In FIG. 1, an input/output terminal $I_N$ receives a 6-bit image signal Po sent from a CCD sensor or the like, and a smoothed signal Ps (six bits) is then obtained through a two-dimensional smoothing circuit 1. The smoothed signal Ps is supplied to a binarizing circuit 2 for dither processing, and is converted to a moiré suppressed binary signal Pd. The moiré suppressed binary signal Pd is output from an output terminal OUT in accordance with the discrimination result from a discriminator 6, to be described later (i.e., when it is discriminated as a picture image or a dot image), and is then supplied to a printer.

The smoothed signal Ps is input to a lower 6-bit address terminal of a ROM 3. An upper 4-bit address terminal of the ROM 3 receives 2-bit position data for original scanning directions x and y orthogonal to each other.

When data Pt subjected to a given calculation (Pt=Ps±n) is prestored at a predetermined address in the ROM 3, a calculation for superposing a ±n level onto the smoothed value Ps can be performed using 4×4 pixels as one cycle. At this time, when a constant +n level is added to the data Pt given by the above relation, a relation Pt≧0 can always be established. When the constant +n level is added to the image signal Po using an adder 4 to establish Pn=Po+n, both the sum data Pn and the output data Pt from the ROM 3 can have seven bits.

The sum data Pn is subjected to comparison processing by a comparator 5 using the output data Pt as a threshold value, thus obtaining a binary signal P with high precision.

Figure 3:
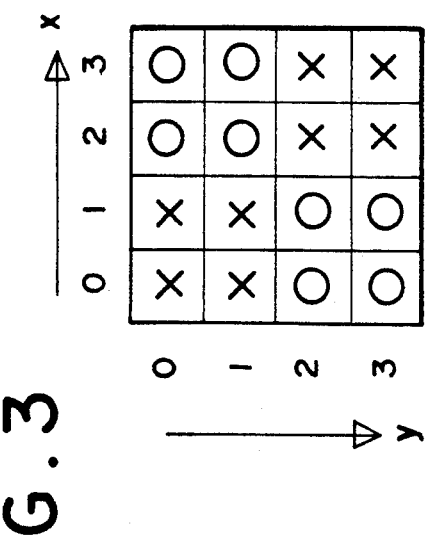
FIG. 3 is a view for explaining a data pattern stored in a ROM 3 in FIG. 1.

FIG. 3 shows a matrix representing the data Pt to be written in the ROM 3. When the data shown in FIG. 3 is written in the ROM 3, a high resolution binary signal P which is binarized to be a dot image to have a dot line number of about 144 lines/inch and a screen angle 45° (area ratio: white/black=50%) can be obtained from an image in a halftone area having a uniform density.

Therefore, the discriminator 6 for discriminating the image type of the high resolution signal P can discriminate this halftone image area as a dot area having about 144 lines/inch as the number of lines and 45° as the screen angle. As a result, a dither-processed binary signal Pd can be sent through an image switch SW.

For the line image or character area, the high resolution signal P is used without being changed, so that a sharp line image can be reproduced.

Since the edge portions of the character and line images have steep inclination of the amplitude of the density, even if n is set at 1 or 2 (level), almost no degradation in image quality will be caused.

The image type discrimination algorithm of the discriminator 6 will now be described. The discrimination algorithm described below is also described in U.S. Pat. No. 4,821,334 by the present applicants.

In order to discriminate character and dot images, the following two factors are considered.

(1) Although a dot image has a high spatial frequency in both the two orthogonal directions a character or line image often has a high spatial frequency in one of the two directions.

(2) A dot image is a set of round points; a character (especially, a Chinese character) is a set of orthogonal lines.

Upon utilizing of the above features, a feature value $Pf(x,y)$ is defined.

A value $S(x,y)$ indicating the degree of dependency of a pixel of interest (or "continuity" of that pixel with neighboring pixels) is given by the following relation in accordance with the states of eight pixels surrounding the pixel of interest $P(x,y)$:

$$S(x,y) \triangleq [P(x,y) \oplus P(x-1,y-1)] \cdot$$
$$[P(x,y) \oplus P(x+1,y+1)] +$$
$$[P(x,y) \oplus P(x-1,y)] \cdot [P(x,y) \oplus P(x+1,y)] +$$
$$[P(x,y) \oplus P(x-1,y+1)] \cdot [P(x,y) \oplus P(x+1,y-1)] +$$
$$[P(x,y) \oplus P(x,y-1)] \cdot [P(x,y) \oplus P(x,y+1)]$$

but if $P(x,y) \oplus P(x-1,y) + P(x,y) \oplus P(x+1,y) = 0$
or if $P(x,y) \oplus P(x,y-1) + P(x,y) \oplus P(x,y+1) = 0$, $$S(x,y) \triangleq 0$$

where $\oplus$ indicates exclusive ORing, and $\cdot$ indicates ANDing.

The physical meaning of the value $S(x,y)$ is that it indicates whether or not the pixel of interest (indicated by hatching in FIG. 4) is inverted (i.e., different in value) with respect to two pixels adjacent to itself with respect to each of the four illustrated directions A to D, and when the pixel of interest is inverted in all the four directions, "4" is assigned (if it is inverted in n directions, n is assigned), thereby representing a zero degree of dependency.

However, if "1"s or "0"s are continuously found in either of the two orthogonal directions A and B, since the possibility of a character or line image is high, $S(x,y)=0$ is forcibly obtained.

Note that in order to discriminate an image type area in which the pixel of interest is included, a value obtained by accumulating the value $S(x,y)$ in a region of $2n \times 2m$ pixels (n and m are natural numbers) is defined as follows as the feature value $Pf(x,y)$, and is binarized by a discrimination parameter K:

$$Pf(x,y) \triangleq \sum_{j=-m+1}^{m} \sum_{i=-n+1}^{n} S(x+j, y+i)$$

If $Pf(x,y) > K$, $P(x,y)$ is present in a dot image area. If $Pf(x,y) \leq K$, $P(x,y)$ is present in a character or line area.

Figure 5:
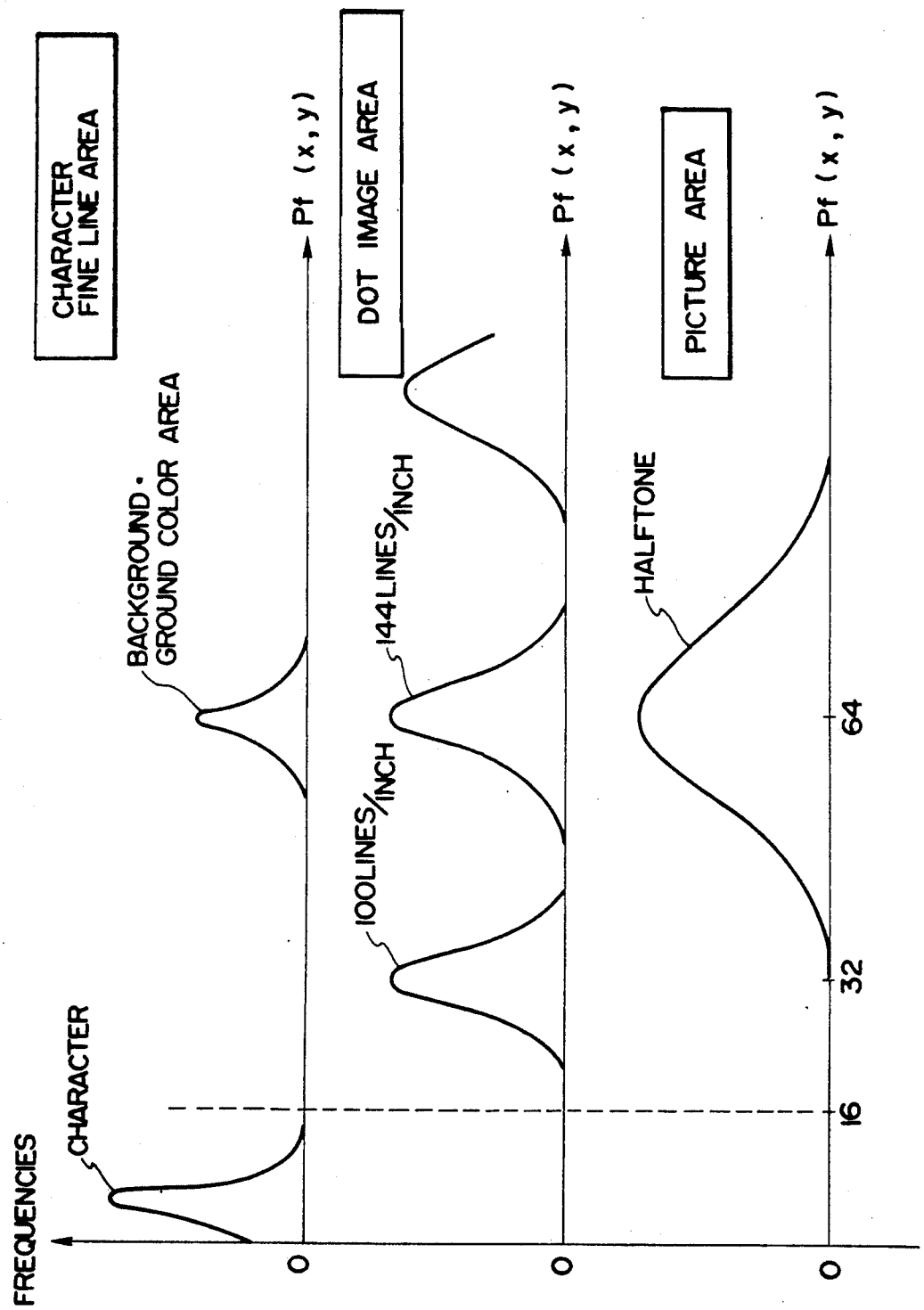
FIG. 5 is a graph showing the relationship between a feature value for each pixel of interest and its frequency calculated in this embodiment.

FIG. 5 shows the relationship between the obtained feature value for each pixel of interest and its frequency. As for the character or fine line area, the feature value $Pf(x,y)$ of a character area is very small, and a background area is typically distributed around an average value 64. As for a picture area, its frequency is also distributed around the average value 64.

Therefore, in this embodiment, in order to suppress moiré with respect to a dot image having 100 lines/inch, $Pf(x,y)=16$ is set as a threshold value K. If the calculated feature value is below the threshold value, a high-resolution binary signal is derived, and if it exceeds the threshold value, a moiré-suppressed binary signal subjected to dither processing is derived.

Upon such image type discrimination, the picture area can be binarized as a high-quality dither image. As for a ground color character, a character area is clearly binarized, and a ground color area is subjected to dither processing, thus accurately binarizing the entire original image.

Figure 6:
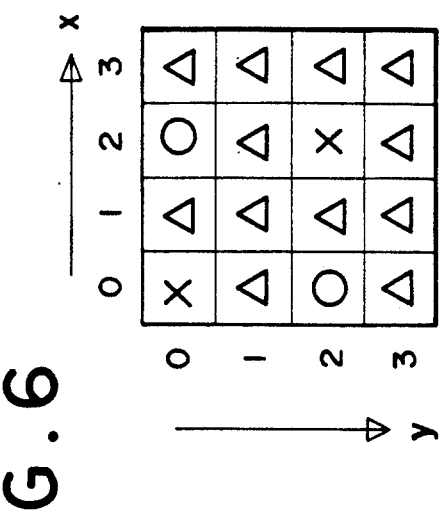
FIG. 6 is a view for explaining a data pattern of a ROM 3 according to a second embodiment of the present invention.

FIG. 6 shows a data matrix of a ROM 3 according to a second embodiment of the present invention. More specifically, taking the feature value Pf into consideration without limiting ourselves to the pattern shown in FIG. 3, arithmetic operation processing as shown in FIG. 6 can be performed.

In the pattern shown in FIG. 6, +0 processing (mark indicated by the $\Delta$) is performed in addition to $\pm n$ processing. At this time, the value Pf is about 64 (144 lines/inch), and is effective for processing in which degradation in image quality is minimized.

The basic pattern of the data matrix can be selected to be $2 \times 2$ pixels or $8 \times 8$ pixels in addition to $4 \times 4$ pixels.

In addition, the above-mentioned processing can be performed by a normal gate circuit or a PLA (Programmable Logic Array) without using a ROM.

Since a halftone area can theoretically be binarized to be a dot image by the discrimination algorithm after binarization, the present invention is not limited to the algorithm described in the above embodiments.

As described above, in the above embodiments, a signal of a predetermined level having a given cycle (e.g., $\pm n$ (n=1 or 2)) is superimposed on smoothed image data to obtain a new threshold signal for binarization. In a halftone image which easily causes recognition error, since a level difference between the scanned original data and its smoothed value is 0 or several levels, the area is binarized using the new threshold value signal to the a dot image of the predetermined number of lines (i.e., temporarily converted into a dot image area). Thereafter, image type discrimination can be stably performed.

Note that the above-mentioned apparatus can be realized with low cost using several ICs.

A third embodiment of the present invention will now be described.

As described above, in the present invention, two-dimensional smoothing processing is performed near the pixel of interest, the pixel of interest is binarized using the smoothed data as the threshold value, and the binarized image is subjected to a predetermined discrimination algorithm to discriminate an image type. More specifically, image data (e.g., image data obtained by quantizing a CCD element output into six bits) Po received at the input terminal $I_N$ is smoothed by a two-dimensional smoothing circuit 1 to be converted to the smoothed data Ps. The smoothed data Ps is subjected to halftone processing by a dither circuit 2 to be binarized, and is used as a moiré suppressed binary signal. The threshold value (the smoothed data Ps) is used as the threshold value for a high-resolution binarizing circuit 5, thus obtaining the high resolution binary signal P.

A discriminator 6 discriminates an image type of an input image (i.e., whether it is a dot image, a picture, or a character or line image). If the input image is a dot image or picture, the moiré suppressed binary signal is selected, and if the input image is a character or line image, the high-resolution binary signal is selected.

In this apparatus, the smoothed data is used as an input signal for obtaining moiré suppressed binary data, and an original image is binarized with high resolution using the smoothed data as the threshold value. Then, two-dimensional image type discrimination processing is performed in accordance with the binary image. As a result, (1) The smoothing circuit has high cost-performance (i.e., costs relatively little considering its performance).

(2) The size of the discriminator can be reduced.

(3) Character and line images can be binarized with high precision.

Since the discrimination algorithm considers the degree of dependency (and thus also the degree of independency) of the binary image, separation precision of the character or line image and the dot image becomes very high. However, for an original, e.g., a picture, whose density is moderately changed from one point to another nearby, since binarization is performed in accordance with small changes in density of the original, the obtained binary image has no halftone area, and stable discrimination cannot be performed. More specifically, when the density of an original is substantially uniform or varies only moderately, the above advantages (1) to (3) cannot be satisfactorily effected.

In this manner, the apparatus shown in FIG. 2 takes into consideration the difference in two-dimensional spatial frequency characteristics of character or line images and dot images, and cannot accurately discriminate the image type of an original, e.g., a picture, whose density varies only moderately.

Figure 7:
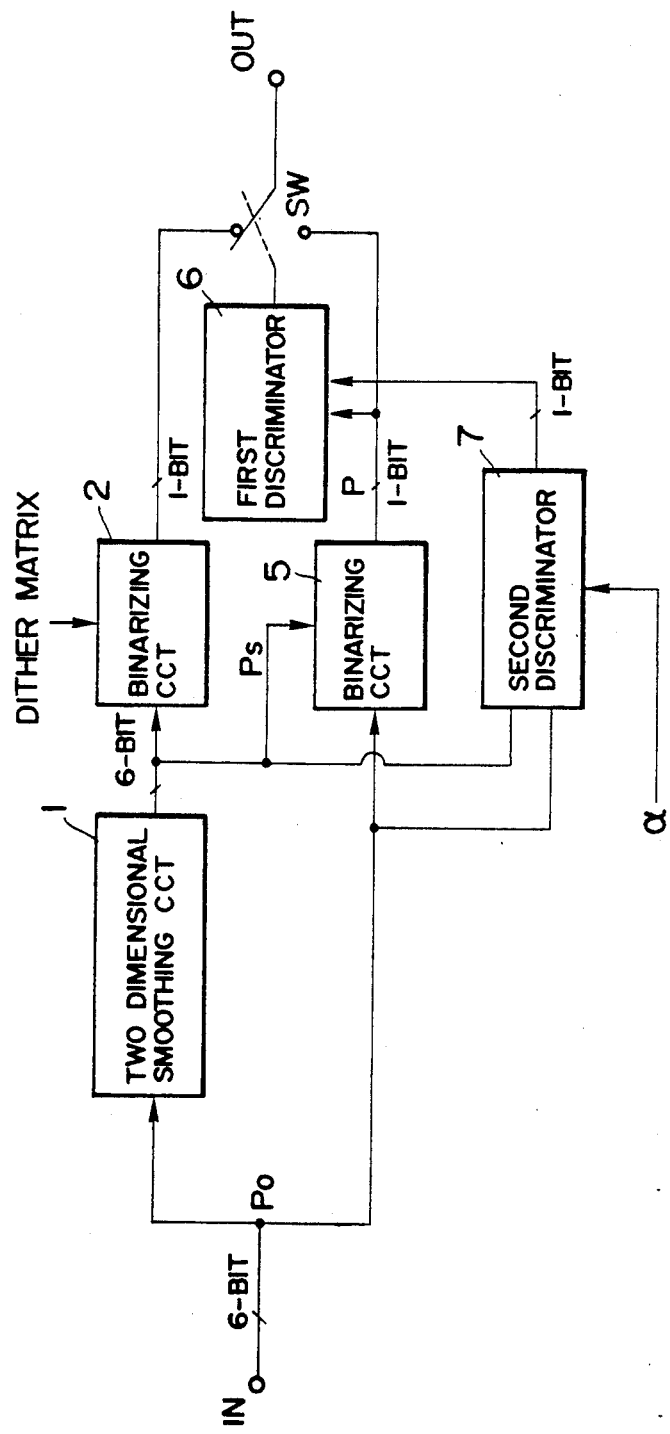
FIG. 7 is a block diagram of an image processing apparatus according to a third embodiment of the present invention.

FIG. 7 is a block diagram of an image processing apparatus according to the third embodiment of the present invention. In the third embodiment, a second discriminator 7 is added to the apparatus shown in FIG. 2.

In the second discriminator 7, a difference between data Po of the pixel of interest (hereinafter "pixel-of-interest data") and smoothed data Ps is extracted, and when the absolute value of the difference is smaller than a predetermined threshold value, it is discriminated that the original image is a picture image.

When the second discriminator 7 discriminates a picture image, a first discriminator 6 is driven, a switch SW is forcibly switched to a dither circuit 2 side, thus deriving a signal which is subjected to dither processing and is binarized.

When an original image is a character or line image, since the above absolute value becomes larger than the predetermined threshold value in the second discriminator 7, the switch SW is connected to a binarizing circuit 5 side as in the conventional apparatus, thus deriving a high-resolution binary signal.

When an original image is a dot image, the switch SW is connected to the dither circuit 2 side in accordance with discrimination of the algorithm in the first discriminator 6 as in the conventional apparatus.

Figure 8:
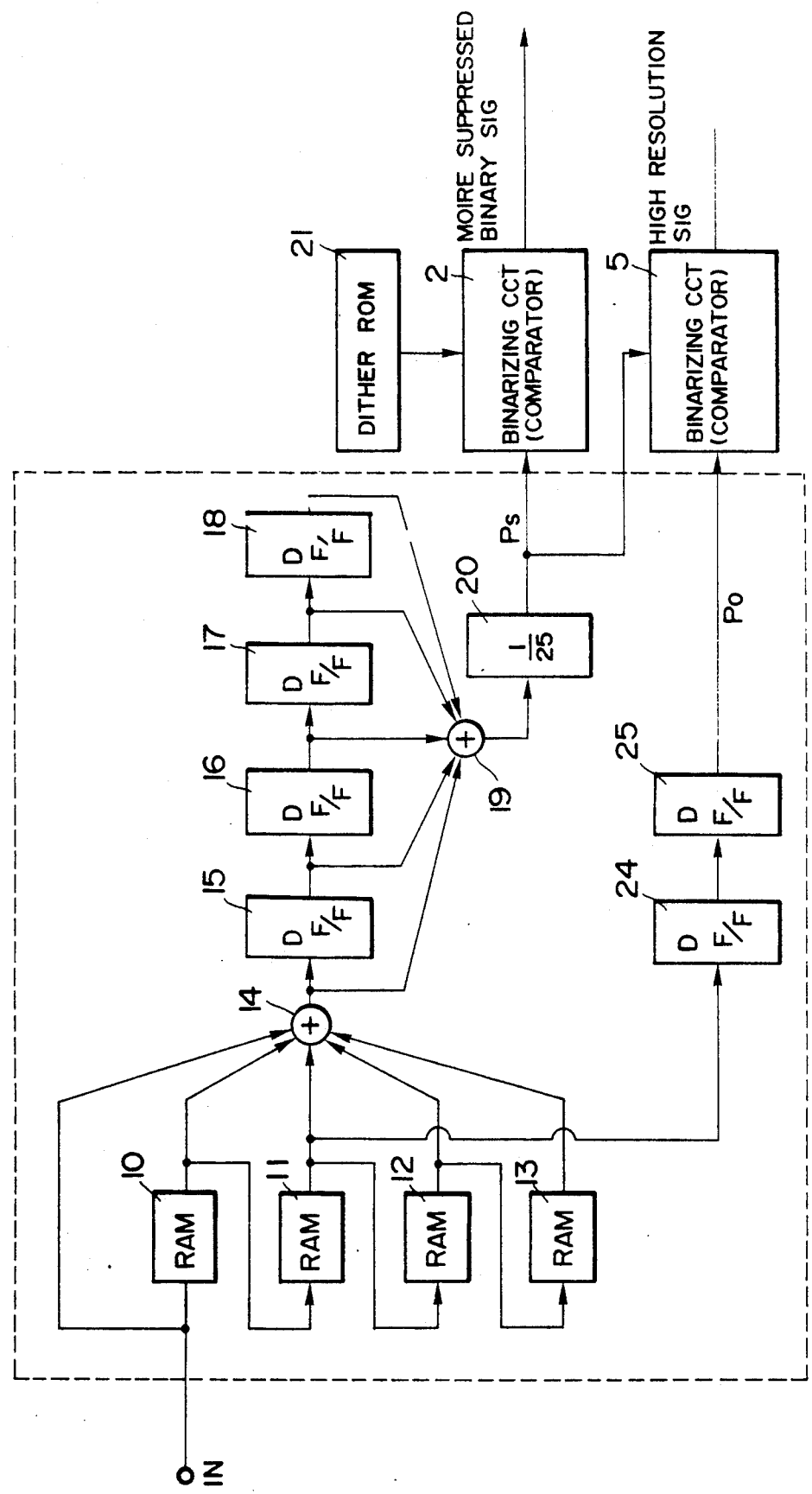
FIG. 8 is a detailed block diagram of a two-dimensional smoothing circuit 1.

FIG. 8 is a detailed block diagram of a two-dimensional smoothing circuit 1.

Image data is delayed by one line by each of RAMs 10, 11, 12, and 13, respectively. Therefore, a value obtained by adding the outputs from the four RAMs 10, 11, 12, and 13 and input data from an input terminal $I_N$ by means of an adder 14, is a sum corresponding to five lines on an identical column. Furthermore, the sum is shifted and held for each column using delay flip-flops 15, 16, 17, and 18. Each time that data for one column is scanned, the outputs from the four delay flip-flops 15, 16, 17, and 18 and the output from the adder 14 are added by an adder 19.

Therefore, the output of the adder 19 is a sum of the data for 25 ($=5\times5$) pixels. The output sum is divided by 25 by a divider 20, so that smoothing processing in which weighting coefficients are all 1 is performed for $5\times5$ pixels surrounding the pixel of interest. In FIG. 8, Ps indicates the smoothed signal.

At this time, line data including the pixel of interest is obtained from the RAM 11, and the pixel of interest corresponds to an output signal Po obtained by delaying data in the line by two columns by delay flip-flops 24 and 25.

The smoothed data Ps is binarized by a comparator 2 using the output data of a dither ROM 21 as a threshold value, and is used as moiré suppressed binary data. At the same time, in a comparator 5, the pixel-of-interest data Po is binarized using the smoothed data Ps as the threshold value, thus obtaining a high resolution signal.

In terms of the arrangement of the two-dimensional smoothing circuit 1, the profile and the size of a smoothing mask is selected in accordance with the size of hardware, cost, and the like. While it may be one corresponding to a $5\times5$ rectangular mask, discrimination (to be described later) will not be limited thereby.

The second discriminator 7 will be described in detail with reference to FIGS. 9A and 9B.

Figure 9A:
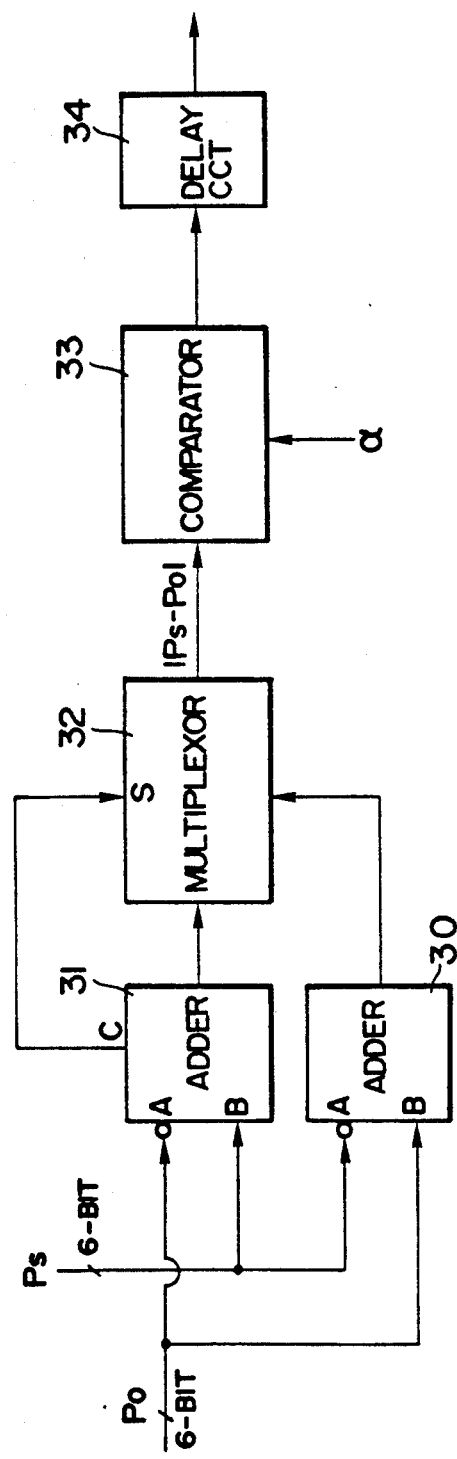
FIGS. 9A and 9B are detailed block diagrams of a second discriminator 7.

Referring to FIG. 9A, an adder 31 performs a calculation Ps+($-$Po) between the smoothed data Ps and the pixel-of-interest data Po, and if Ps$-$Po$\geq$0, a carry output C of the adder 31 is set to be "1". A multiplexer 32 selects the output side of the adder 31 in response to the output "1".

If Ps$-$Po$<$0, an adder 30 performs a calculation Po+($-$Ps). In this case, since Po$-$Ps$>$0, when the calculation result is input to the multiplexer 32, the calculation result |Ps$-$Po| can always be obtained from the multiplexer 32. At this time, the carry output of the adder 31 is "0".

A comparator 33 compares the output |Ps$-$Po| with a predetermined value $\alpha$ (in this embodiment, $\alpha$ is 1 or 2). If |Ps$-$Po|$<\alpha$, the comparator 33 discriminates a halftone area, and if |Ps$-$Po|$>\alpha$, it discriminates that the area is of another type. Then, the comparator 33 outputs a discrimination result signal (1-bit signal). A delay circuit 34 is used for supplying the discrimination result signal to the first discriminator 6.

Figure 9B:
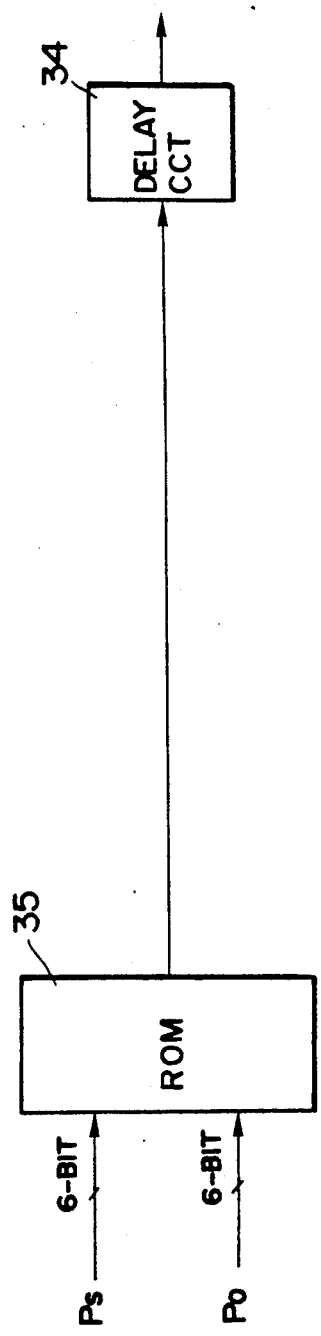

Note that the above discrimination can be carried out using a ROM 35 shown in FIG. 9B. More specifically, 6-bit signals of the smoothed data Ps and the pixel-of-interest data are connected to an address input terminal of the ROM 35. When the above-mentioned comparison result between the absolute value calculation result and the predetermined value o is prestored therein as 1-bit data, the same processing as in FIG. 9A can be performed.

The high resolution signal P(x,y) is then supplied to the first discriminator 6 to be subjected to image type discrimination. Note that since the image type discrimination algorithm in the discriminator 6 has been described in the first embodiment, it is omitted herein.

A detailed circuit for executing the algorithm will be described with reference to FIG. 10.

Figure 4:
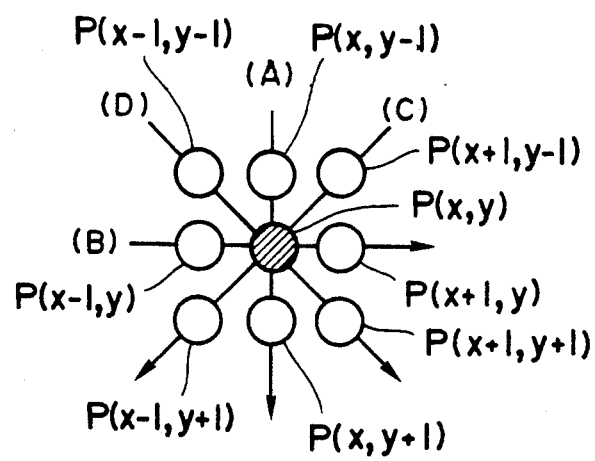
FIG. 4 is a diagram for explaining an image type discrimination algorithm.
Figure 10:
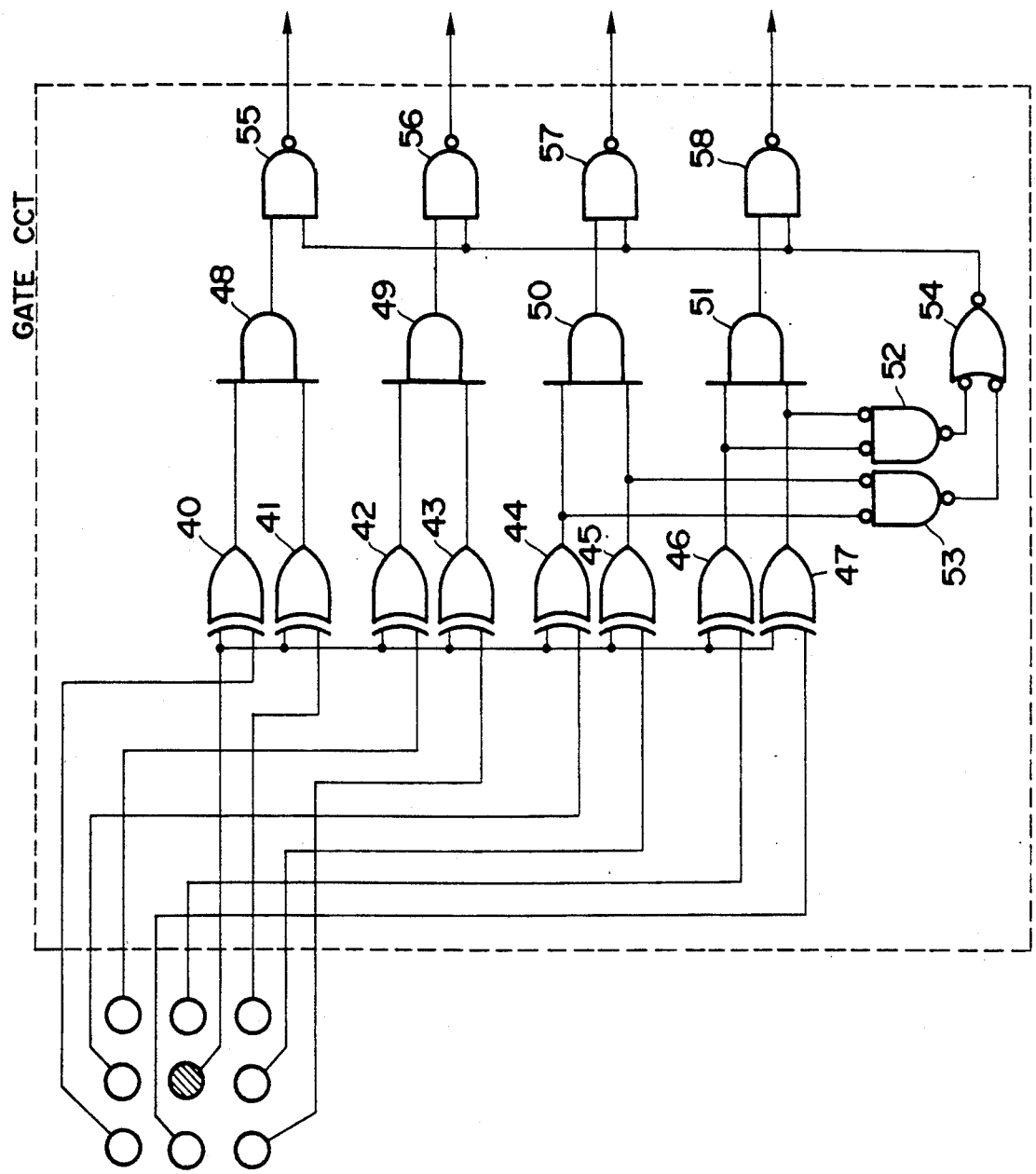
FIGS. 10 and 11 are detailed circuit diagrams of a first discriminator 6.

FIG. 10 is a circuit for assigning a factor S(x,y) indicating a degree of dependency to pixel . A degree of dependency in the direction D change "4"to FIG. 4 is calculated with respect to a pixel of interest (should hatched) by an AND gate 48 which receives the outputs of exclusive OR gates 40 and 41. More specifically, when two pixels adjacent to the pixel of interest in the direction D are inverted with respect to the pixel of interest, data "1" is obtained from the output terminal of the AND gate 48. Similarly, exclusive OR gates 42 and 43 and an AND gate 49 perform a calculation of the dependency in the direction C, exclusive OR gates 44 and 45 and an AND gate 50 perform a calculation for the direction A, and exclusive OR gates 46 and 47 and an AND gate 51 perform a calculation for the direction B. AND gates 52 and 53 and an OR gate 54 are a gate circuit for detecting a case wherein data "0" or "1" is continuously found (i.e., for three pixels, in FIG. 10) in either of the two orthogonal directions A and B. In this case, the output of the OR gate 54 becomes "0".

Therefore, when AND products are obtained between the output of the OR gate 54 and each of the first outputs of the AND gates 48, 49, 50, and 51 indicating the degree of dependency in the four directions, outputs corresponding to the factor S(x,y) can be obtained from NAND gates 55, 56, 57, and 58.

More specifically, of these four outputs, the number "0" corresponds to S(x,y)=0 to 4. This calculation is performed by inputting these four outputs to address input terminals of ROMs 97 to 100 (to be described later).

Figure 11:
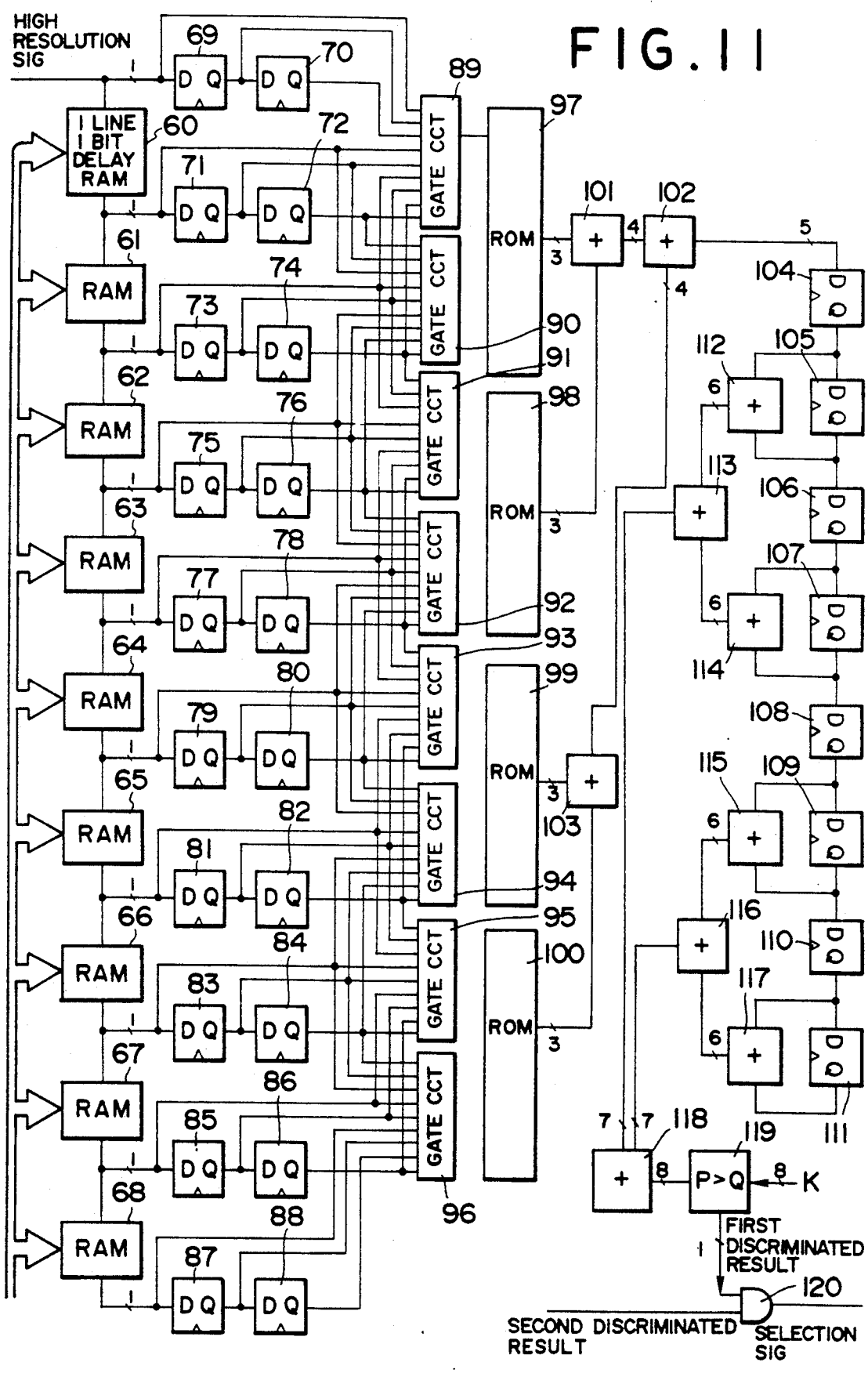

A circuit for accumulating S(x,y) over a predetermined area near the pixel of interest to calculate a feature value Pf(x,y) will now be described with reference to FIG. 11. More specifically, FIG. 11 shows the entire first image type discriminator 6. The high resolution signal P is sequentially delayed by one line by one-bit RAMs 60, 61, 62, 63, 64, 65, 66, 67, and 68. As a result, binary image data for 10 lines on an identical column simultaneously appear at the input/output terminals of these RAMs.

These outputs are parallel delayed by two columns using delay flip-flops 69, 70, 71, 72, 73, 74, . . . , 87, and 88, thereby simultaneously obtaining binary images of 3 columns × 10 lines (30 pixels).

Paying attention to the input/output terminals of the delay flip-flops 69, 70, 71, 72, 73, and 74 and assuming, for example, that the signal at the output terminal of the delay flip-flop 71 is the pixel of interest, states of eight pixels (four directions) adjacent to the pixel of interest can be detected. Therefore, the S(x,y) calculation circuit shown in FIG. 10 corresponds to the gate circuit 89 shown in FIG. 11.

Similarly, when the pixel of interest is shifted by one line, and the output of the delay flip-flop 73 is used as the pixel of interest, its S(x,y) value can be obtained from a gate circuit 90, and the S(x,y) value corresponding to the output of the delay flip-flop 75 further shifted by one line can be obtained from a gate circuit 91.

As described above, S(x,y) values for eight lines can be obtained from gate circuits 89, 90, 91, 92, 93, 94, 95, and 96, respectively. ROMs 97, 98, 99, and 100 serve to add two of the S(x,y) values obtained from the respective gate circuits.

Sums 0 to 8 of two pixels of the S(x,y) values are obtained from these ROMs 97, 98, 99, and 100. However, since no two adjacent pixels can simultaneously have the S(x,y) values 4, the ROMs 97, 98, 99, and 100 need only have 3-bit output lines.

When the outputs of the ROMs 97, 98, 99, and 100 are added using adders 101, 102, and 103, an accumulation value of the S(x,y) values for eight pixels can be obtained from the adder 102. Furthermore, the output of the adder 102 is delayed and held for each column using delay flip-flops 104 to 110, and their outputs are added by adders 112 to 118, thereby obtaining a feature value Pf for 64 (=8×8) pixels. Note that the Pf value is a value for a pixel located at substantially the central position. Thus, whether or not the pixel is within a character or fine line area can be discriminated by comparing the Pf value with a predetermined value K by a comparator 119. A 1-bit discrimination result output from the comparator 119 is input to an AND gate 120.

More specifically, one input terminal of the AND gate 120 receives the first discrimination result output from the comparator 119 and the other input terminal thereof receives the result from the second discriminator 7 (see FIGS. 9A and 9B), thus obtaining an AND product therebetween. A 1-bit selection signal output from the AND gate 120 drives a switch SW. If the first discrimination result indicates a character or line image area and the discrimination result from the second discriminator 7 does not indicate a halftone area of a picture, a high resolution signal output from the binarizing circuit 5 is selected as a final result. If the discrimination result of the second discriminator 7 indicates a halftone area or a picture, a moiré suppressed binary signal output from the dither circuit 2 is selected regardless of the first discrimination result.

In the second discriminator 7, the absolute value of the difference between the smoothed data and the scanned image data is calculated, and is compared with the predetermined threshold value. Alternatively, the densities of several pixels near the pixel of interest of the scanned image data or smoothed data can be detected to calculate the difference between the densities.

When the density difference is calculated, if several upper bits are used without using all the image data (e.g., six bits), image type discrimination can be made with high precision.

As described above, in the third embodiment, attention is paid to the fact that a halftone image area does not have a change in density microscopically, so that pixel-of-interest data and pixel data therearound are smoothed to obtain a difference between the pixel of interest data and the smoothed data, and if the difference is below a predetermined value, a picture image or an image having a fixed density area is discriminated.

With the above algorithm, a picture area which often would be erroneously discriminated as a character region can be accurately discriminated, thus allowing highquality image reproduction.

For a picture area, whether the smoothed data is subjected to dither processing or scanned data is subjected directly to the dither porcessing, the reproduced image remains almost the same. In the third embodiment, the smoothed data is subjected to the dither processing as in a dot image area, thereby binarizing the picture area.

A fourth embodiment of the present invention will be described.

Prior to the description of the fourth embodiment, the image type discrimination principle of the fourth embodiment, the binarization principle, and the smoothing principle will be described.

First, the image type discrimination principle will be described with reference to FIG. 13.

Figures 13, 14:
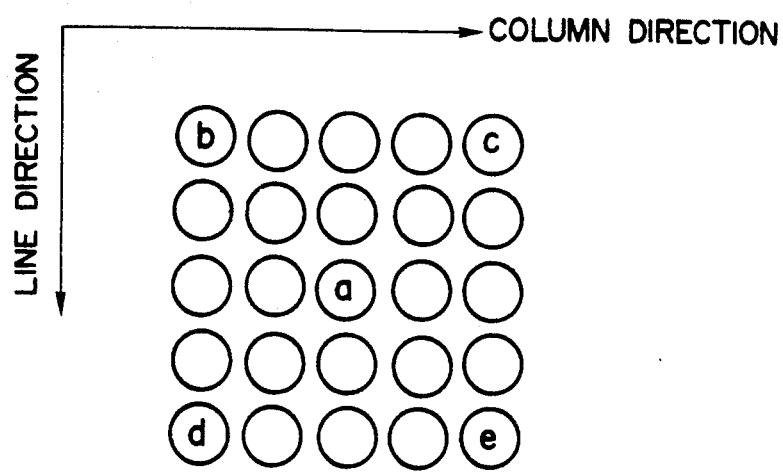
FIG. 13 is a view of pixel alignment for explaining an image discrimination algorithm.
FIG. 14 is a view for explaining the operation of a ROM 203 shown in FIG. 12.

FIG. 13 is a view for explaining an image type discrimination algorithm. As shown in FIG. 13, assuming that a central pixel a of pixels arranged in a 5 (lines)×5 (columns) matrix is used as a pixel of interest. Thus, image type discrimination can be performed based on differences between density levels of the pixel of interest and four pixels b to e therearound. For example, (1) if the maximum level difference between the pixels a, b, c, d, and e≧2,
or if the level of b=the level of c=the level of e=the level of d and the level of a≠the level of b,
the pixel of interest is a character or line image, or a dot image having a small number of lines;

(2) otherwise,
the pixel of interest is a picture, a halftone image, or a dot image having a large number of lines, where the levels of a to e are represented by two bits (0, 1, 2, and 3).

Therefore, in accordance with the above algorithm, two image types can be sequentially discriminated for each pixel.

The binarization principle of the fourth embodiment will be described.

If the image type (1) is discriminated by the above algorithm, since a relatively high resolution is required for this type of image, so-called slice processing is performed, using a fixed threshold value.

If the image (2) is discriminated, since moiré noise is generated by a dot image, smoothing processing (to be described later) is performed and then dither processing is performed.

Normally, the smoothing mask to be used depends on the number of target dot lines. However, in the embodiment described below, smoothing processing is performed within the range of four pixels in a raster scanned column direction (horizontal direction in FIGS. 13 and 14)×two lines in a line direction (vertical direction in FIGS. 13 and 14) (i.e., in the range of 4×2 pixels), and moiré is suppressed with respect to the number of dot lines exceeding about 150 lines/inch (screen angle 45°).

In this case, for one of two lines, an N-bit image signal (in this embodiment, a 6-bit image signal) can be obtained by using an original image signal currently scanned by raster scanning without requiring a line memory, and can be used as smoothing data. For data representing the other line, n-bit image data (in this embodiment, 2-bit data) prestored for image type discrimination is used.

In this manner, when smoothing processing for eight (4×2) pixels is performed, four pixels are represented by six bits, and the remaining four pixels are represented by two bits. For this purpose, if the two-bit data is multiplied by 21 in order to adjust the level of two bits with the level of six bits, the quaternary levels (0, 1, 2, and 3) of the 2-bit signals undesirably change greatly becoming 0, 21, 42, and 63. For this reason, since the smoothed values abruptly change near the density levels "21" and "42", the obtained smoothed values virtually have four gray levels.

In the fourth embodiment, when 6-bit data is converted to 2-bit data, a threshold value therefore is periodically changed in accordance with pixel positions, thereby compensating for discontinuity occurring after the smoothing processing. The procedures for bit number conversion will be described below in more detail.

Normally, when 6-bit data is converted to 2-bit data, the upper two bits of the 6-bit data are to be used. At this time, if the upper two bits are used after a predetermined value is added to the 6-bit data, this amounts to changing threshold values for quaternarization (conversion to 2-bit data).

FIG. 14 shows a 4 (lines)×4 (columns) matrix representing values to be added to density data for each pixel, and is an example of quaternarization on the basis of 2 lines×4 columns. For example, if a value to be added is "6", quaternary data (represented by decimal notation) obtained by converting 6-bit data to 2-bit data is as follows:

| 6-bit data | Quaternary data |
| --- | --- |
| 0 to 9 | 0 |
| 10 to 25 | 1 |
| 26 to 41 | 2 |
| 42 to 63 | 3 |

The reason for this is that if a value to be added is "0", respective density data (six bits: 0 to 63) would be:

| 6-bit data | Quaternary data |
| --- | --- |
| 0 to 15 | 0 |
| 16 to 31 | 1 |
| 32 to 47 | 2 |
| 48 to 63 | 3 |

The quaternarized data obtained with the above processing is added for each plurality of pixels, and the result is multiplied with 21, so that a value approximate to original.6-bit data can be obtained.

A change in 6-bit data is small within the small area shown in FIG. 14. Therefore, in the eight (=2×4) pixel area, in order to obtain different quaternarized threshold values, normally quaternarized levels are further segmented to eight levels.

After simple smoothing processing by adding 6-bit data for four pixels and 2-bit data for four pixels (described with reference to FIG. 12), linearity with respect to input data can be greatly improved.

As can be seen from FIG. 14, in the pattern of FIG. 14, pixels separated by two pixels in a 45° direction are processed using the same threshold value. Thus, during image type discrimination shown in FIG. 14, for the above-mentioned pixels a to e, original relative changes in their densities are left unchanged. Therefore, the quaternarization will not directly influence a discrimination precision.

A detailed means for realizing the above-mentioned processing will be described with reference to the circuit diagram of the fourth embodiment shown in FIG. 12.

Figure 12:
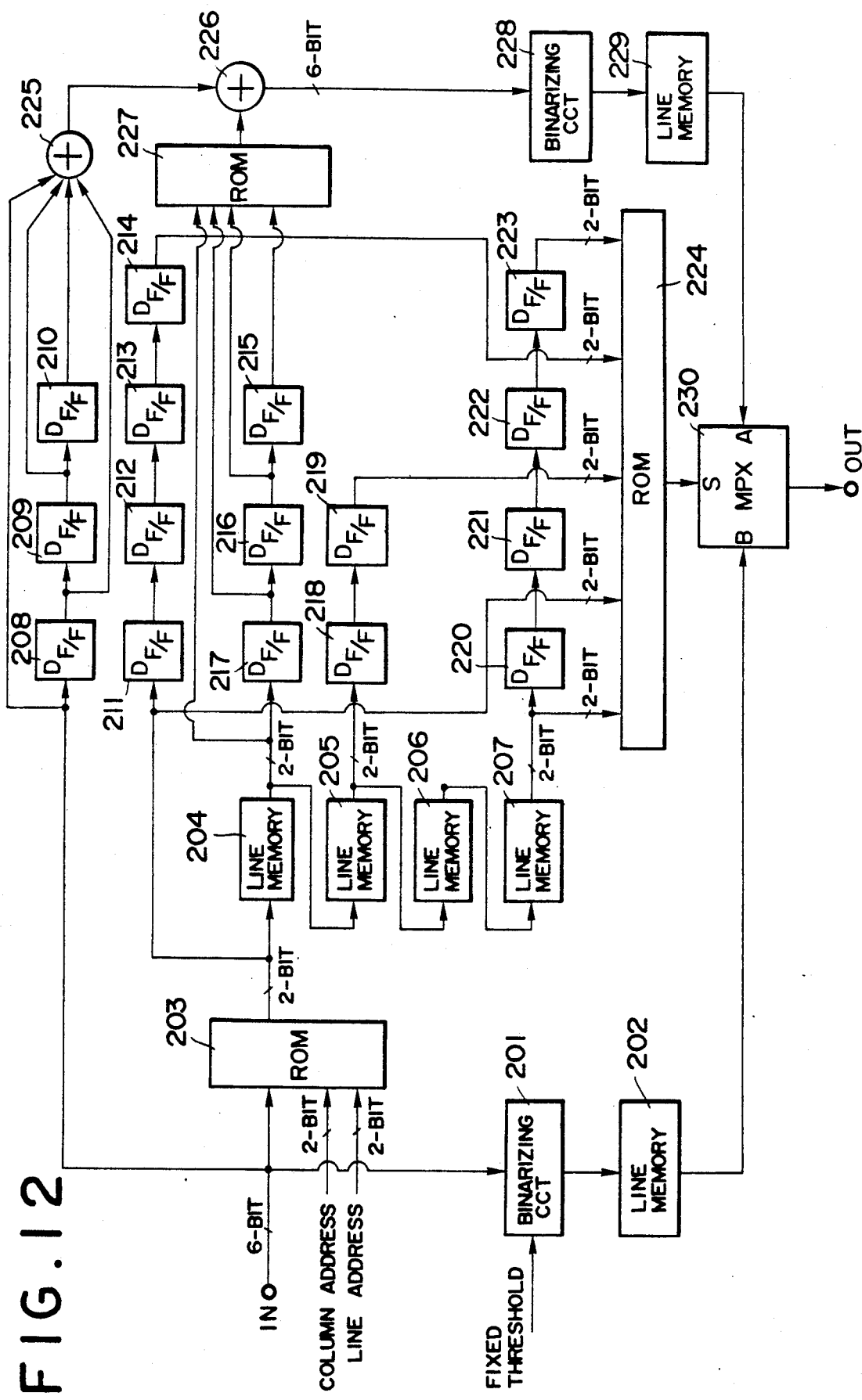
FIG. 12 is a block diagram of an image processing apparatus according to a fourth embodiment of the present invention.

Referring to FIG. 12, a quaternarizing ROM 203 receives 6-bit image data from an input terminal IN at its input lower six bits, and receives 2-bit column and line addresses indicating the position of each pixel data at its upper four bits.

The ROM 203 is a data conversion ROM allowing modulation quaternarization shown in FIG. 14, and outputs data converted to two bits. The 2-bit data is supplied to line memories 204, 205, 206, and 207, and image data sequentially delayed by one line on an identical column can be simultaneously detected from their output terminals.

The outputs of the quaternarizing ROM 203 and the line memories 204, 205, 206, and 207 are supplied to delay flip-flops 211 to 223. For example, assuming that data supplied to the input terminal of the delay flip-flop 211 is the pixel b in FIG. 13, output data further delayed by four pixels in the column direction by the delay flip-flops 212, 213, and 214 corresponds to the pixel c in FIG. 13. The signal at the input terminal of the line memory 204 corresponding to the pixel b is delayed by two lines by the line memories 204 and 205, and is further delayed by two pixels by the delay flip-flops 218 and 219 in the column directions. The resultant signal corresponds to the pixel a in FIG. 13. The similarly obtained input signal of the delay flip-flop 220 and the signal further delayed by four pixels by the delay flip-flops 220, 221, 222, and 223 respectively correspond to the pixels d and e in FIG. 13.

The obtained five pixel data (a to e) are input to the address input terminals of an image type discrimination ROM 224. The previously mentioned discrimination algorithm is prestored in the ROM 224, so that a multiplexer 230 is switched in accordance with the discrimination result.

6-bit data necessary for smoothing processing is supplied to the delay flip-flops 208, 209, and 210 from the input terminal IN, and four pixels adjacent in the column direction are derived therefrom and added (smoothed) by an adder 225. 2-bit data delayed by one line from the line to which the above pixels belong are obtained from the respective input/output terminals of the delay flip-flops 217, 216, and 215 connected to the output of the line memory 204. The four 2-bit pixel data are input to the address input terminals of an operating RAM 227. The ROM 227 adds the input data and outputs a value multiplied with 21 (6-bit data). More specifically, data conversion is performed by the ROM 227.

An adder 226 adds 6-bit data for four pixels sent from the adder 225 and the data for four pixels sent from the adder 227, and uses the upper six bits of the sum data to obtain a smoothed value for eight pixels.

The output data of the adder 226 is supplied to a binarizing circuit 228 using the dither method. The output data of the binarizing circuit 228 is supplied to a line memory 229 and is delayed by two lines and several pixels, thus adjusting the a timing with the image type discrimination result from the ROM 224.

Another binarizing circuit 201 using a given threshold value binarizes the 6-bit original signal using a fixed threshold value (or a threshold level in terms of a background density level obtained from a separate circuit (not shown)), thus obtaining an ABC (auto background control) binary signal. The binary signal is also delayed by the line memory 202 to adjust the timing with the discrimination result of the ROM 224.

If the discrimination result of the ROM 224 indicates a character or line image or a dot image having a small number of lines, the multiplexer 230 selects the input B side to output the binary data to an output terminal OUT. On the other hand, if the discrimination result of the ROM 224 indicates a halftone image or a dot image having a large number of lines, the multiplexer 230 selects the input A side, and the moiré suppressed output signal can be obtained from the output terminal OUT.

Note that the data matrix of the smoothing mask is not limited to to size used in this embodiment, but can be a 3×3, or 5×2, or 5×3 matrix. In this case, the number of reproduction levels (i.e., the number of gray levels) differs in accordance with the ratio of the number of 6-bit data and the number of 2-bit data.

The values to be added, as illustrated in FIG. 14, are not limited to those in this embodiment. Also, a conversion algorithm can have nonlinear characteristics if it is synchronous with a cycle corresponding to the reference pixel position shown in FIG. 13.

In the above embodiment, an image is quaternarized (quantized to 2-bit data), but can be processed into 3-bit or 4-bit data in order to increase the number of gray levels to be reproduced or to improve discrimination precision.

As described above, in the fourth embodiment, an N-bit image signal is converted to an n-bit (N>n) image signal for smoothing processing, and image type discrimination is performed in accordance with the n-bit signal (that is, whether an original image is a halftone image, or a character or line image is discriminated). Thus, the size of the circuit can be greatly reduced. In this case, the N-bit image signal is used without being changed for the smoothing processing in addition to the n-bit signal.

The present invention is not limited to the above embodiments, and various changes and modifications may be made within the spirit and scope of the appended claims.

What is claimed is:

1. An image processing apparatus comprising:
   pixel data input means; and
   processing means for processing pixel data input via said input means,
   wherein said processing means comprises two-dimensional smoothing means for smoothing density levels of a plurality of pixels including a pixel of interest, first combination means for combining predetermined level data as offset data with the output data of said two-dimensional smoothing means, binarizing means for binarizing data of the pixel of interest in accordance with the output of said first combination means and discriminating means for discriminating an image type of the data of the pixel of interest in accordance with continuity, in two dimensions of the pixel of interest with a predetermined set of other pixels of the binary data from said binarizing means, said continuity being measured on the basis of which of said set of other pixels have values having a predetermined relation to a value of the pixel of interest.

2. An apparatus according to claim 1, wherein said binarizing means binarizes the data of the pixel of interest data using the output of said first combination means as a threshold value.

3. An apparatus according to claim 2, wherein a value of the predetermined level data changes at a predetermined cyclic period in association with a position of the input pixel data.

4. An apparatus according to claim 3, wherein said first combination means comprises memory means for receiving the output data of said two-dimensional smoothing means and data indicating the position of the input pixel data as address data.

5. An apparatus according to claim 1, wherein said discriminating means discriminates an independency of the pixel of interest with respect to data of an adjacent pixel in accordance with binarized data of the pixel of interest and binarized data for the adjacent pixel, thus discriminating the image type of the pixel of interest.

6. An apparatus according to claim 5, wherein said processing means further comprises means for halftone processing the output data of said two-dimensional smoothing means, and selecting means for selecting the output of said halftone processing means or the output of said binarizing means in accordance with a result of discrimination performed by said discriminating means, to form a reproduced image.

7. An apparatus according to claim 5, wherein said discriminating means discriminates both a spatial frequency characteristic inherent to the pixel of interest and the independency of the pixel of interest with respect to the adjacent pixel by using the binarized pixel data of the pixel of interest and the binarized pixel data of the adjacent pixel, so as to discriminate the image type of the pixel of interest.

8. An apparatus according to claim 1, wherein said processing means comprises second combination means for combining data of a predetermined value with the input pixel data, an output of said second combination means being input to said binarizing means.

9. An image processing apparatus comprising:
pixel data input means; and
processing means for processing pixel data input via said input means,
wherein said processing means comprises binarizing means for binarizing the input pixel data, first discriminating means for discriminating an image type in accordance with continuity in two dimensions of a pixel of interest with a predetermined set of other pixels, on the basis of binary pixel data output from said binarizing means, said continuity being measured on the basis of which of said set of other pixels have values having a predetermined relation to a value of the pixel of interest, second discriminating means for discriminating an image type by using an image type discriminating method different from a method used by said first discriminating means, and select means for selecting one of a plurality of image forming processes relating to the pixel data in accordance with results of discrimination performed by both of said first and said second discriminating means.

10. An apparatus according to claim 9, wherein each of said first and second discriminating means discriminates an image type for each pixel, and said first discriminating means discriminates an image type of an image portion of interest by using the binarized pixel data of a first pixel within the portion of interest and binarized pixel data for a pixel adjacent to the first pixel.

11. An apparatus according to claim 10, wherein said first discriminating means discriminates an independency of the first pixel with respect to the adjacent pixel on the basis of the binarized pixel data for the first pixel and the binarized pixel data for the adjacent pixel, so as to discriminate the image type of the first pixel.

12. An apparatus according to claim 11, wherein said first discriminating means discriminates both a spatial frequency characteristic inherent to the first pixel and the independency of the first pixel with respect to the adjacent pixel by using the binarized pixel data of the first pixel and the binarized pixel data for the adjacent pixel, so as to discriminate the image type of the first pixel.

13. An apparatus according to claim 12, wherein said first discriminating means comprises means for calculating an exclusive OR sum of both the binarized pixel data of interest and the binarized adjacent pixel data, and means for determining the image tone of the pixel of interest in accordance with the result of the calculation performed by said calculating means.

14. An apparatus according to claim 9, wherein said processing means comprises two-dimensional smoothing means for smoothing density data of pixel data for a plurality of pixels adjacent to the pixel of interest and wherein said binarizing means binarizes the input pixel data by using output data of said two-dimensional smoothing means as a threshold value.

15. An apparatus according to claim 14, wherein said second discriminating means discriminates the image type of the pixel of interest in accordance with a density level of the pixel of interest and the output data of said two-dimensional smoothing means.

16. An apparatus according to claim 14, wherein said processing means has means for halftone processing the output data of said two-dimensional smoothing means, and wherein said select means selects an output of said binarizing means or an output of said halftone processing means in accordance with discrimination results by said first and second discrimination means.

17. An image processing apparatus comprising:
pixel data input means for inputting pixel data quantized to m-bit data;
means for processing the m-bit pixel data input from said input means, wherein said processing means comprises operation means for performing an operation on the m-bit data to output only upper n bits ($1 < n < m$) of the operation result as n-bit pixel data;
memory means for storing a plurality of n-bit pixel data output from said operation means; and
discriminating means for discriminating an image type in accordance with a plurality of n-bit pixel data stored in said memory means.

18. An apparatus according to claim 17, wherein said processing means further comprises smoothing means for receiving the n-bit pixel data and performing a smoothing process, halftone processing means for halftone processing an output from said smoothing means, and select means capable of selecting an output from said half-tone processing means in accordance with a result of discrimination performed by said discrimination means.

19. An apparatus according to claim 18, wherein said processing means further comprises binarizing means for performing a binarizing operation on the m-bit pixel data using a fixed threshold, and said select means selects between an output from said halftone processing means and an output from said binarizing means.

20. An apparatus according to claim 17, wherein said operation means comprises memory means for receiving the m-bit pixel data and data representing a position of the m-bit pixel data as address data and outputting the n-bit pixel data.

21. An apparatus according to claim 17, wherein said discrimination means comprises memory means for receiving both n-bit pixel data of interest corresponding to a pixel of interest and n-bit adjacent pixel data as address data and for outputting a discrimination result relating to an image type for each pixel.

22. An apparatus according to claim 17, wherein said memory means comprises a plurality of line memories, and said discriminating means discriminates the image type on the basis of continuity in two dimensions of a pixel of the interest and its ambient data.

23. An image processing apparatus comprising:
pixel data input means; and
processing means for processing pixel data input via said input means,
wherein said processing means comprises binarizing means for binarizing the input pixel data, first discriminating means for discriminating an image type in a first mode in accordance with continuity in dimensions of a pixel of interest with a predetermined set of other pixels, on the basis of binary output from said binarizing means, said continuity being measured on the basis of which of said set of other pixels have values having a predetermined relation to a value of the pixel of interest, second discriminating means for discriminating an image type in a second mode in accordance with a density difference between the pixel of interest and said set of other pixels, and select means for selecting one of a plurality of image forming processes relating to the pixel data in accordance with results of discrimination performed by said first and second discriminating means.

24. An apparatus according to claim 22, wherein each of said first and second discrimination means discriminates an image type for each pixel, and said first discriminating means discriminates an image type of an image portion of interest by using the binarized pixel data of a first pixel within the portion of interest and binarized pixel data for a pixel adjacent to the first pixel.

25. An apparatus according to claim 24, wherein said first discriminating means discriminates an independency of the first pixel with respect to the adjacent pixel on the basis of the binarized pixel data for the first pixel and the binarized pixel data for the adjacent pixel, so as to discriminate the image type of the first pixel.

26. An apparatus according to claim 25, wherein said first discriminating means discriminates both a spatial frequency characteristic inherent to the first pixel and the independency of the first pixel with respect to the adjacent pixel by using the binarized pixel data of the first pixel and the binarized pixel data for the adjacent pixel, so as to discriminate the image type of the first pixel.

27. An apparatus according to claim 26, wherein said first discriminating means comprises means for calculating an exclusive OR sum of both the binarized pixel data of interest and the binarized adjacent pixel data, and means for determining the image tone of the pixel of interest in accordance with the result of calculation performed by said calculating means.

28. An apparatus according to claim 23, wherein said processing means comprises two-dimensional smoothing means for smoothing density data of pixel data for a plurality of pixels adjacent to the pixel of interest and wherein said binarizing means binarizes the input pixel data by using output data of said two-dimensional smoothing means as a threshold value.

29. An apparatus according to claim 28, wherein said second discriminating means discriminates the image type of the pixel of interest in accordance with a density level of the pixel of interest and the output of said two-dimensional smoothing means.

30. An apparatus according to claim 28, wherein said processing means has means for halftone processing the output data of said two-dimensional smoothing means, and wherein said select means selects an output of said binarizing means or an output of said halftone processing means in accordance with discrimination results obtained by said first and second discrimination means.

* * * * *

UNITED STATES PATENT AND TRADEMARK OFFICE
CERTIFICATE OF CORRECTION

PATENT NO. : 5,177,795

DATED : January 5, 1993

INVENTOR(S) : HIROSHI TANIOKA, ET AL.

It is certified that error appears in the above-identified patent and that said Letters Patent is hereby corrected as shown below: Title page:

IN [56] REFERENCES CITED

Under U.S. PATENT DOCUMENTS, insert:
```
--4,595,956   6/1986   Kawamura et al. ............ 358/283
  4,701,807  10/1987   Ogino ...................... 358/280
  4,723,173   2/1988   Tanioka .................... 358/283
  4,686,579   8/1987   Sakamoto ................... 358/283--.
```

COLUMN 1

Line 28, "moire" should read --moiré--.
Line 41, "image" should read --images-- and "not" should read --not.--.

COLUMN 2

Line 24, "combine" should read --combines--.
Line 25, "out" should read --output--.
Line 44, "N-bit" should read --m-bit--.
Line 45, "N-bit" should read --m-bit--.
Line 48, "N" should read --m--.

COLUMN 5

Line 2, "directions" should read --directions,--.
Line 62, "64" should read --64.--.

COLUMN 6

Line 15, "(mark" should read --(indicated--.
Line 16, "indicated by the Δ)" should read --by the mark Δ)--.
Line 37, "the" (first occurrence) should read --be--.

UNITED STATES PATENT AND TRADEMARK OFFICE
CERTIFICATE OF CORRECTION

PATENT NO. : 5,177,795
DATED : January 5, 1993
INVENTOR(S) : HIROSHI TANIOKA, ET AL.

It is certified that error appears in the above-identified patent and that said Letters Patent is hereby corrected as shown below:

COLUMN 8

Line 52, "o" should read --α--.
Line 63, "pixel." should read --pixels P(x,y).--.
Line 64, "change "4" to FIG. 4" should read --(see FIG. 4)--.
Line 65, "(should" should read --(shown--.

COLUMN 10

Line 48, "highquality" should read --high-quality--.

COLUMN 11

Line 38, "N-bit" should read --m-bit--.

COLUMN 12

Line 45, "a" should be deleted.
Line 53, "its input lower six bits," should read --the lower six bits of its input--.

COLUMN 13

Line 28, "RAM" should read --ROM--.
Line 29, "with" should read --by--.
Line 40, "a" should be deleted.
Line 61, "to" (first occurrence) should be deleted.

COLUMN 14

Line 9, "N-bit" should read --m-bit-- and "(N>n)" should read --(m>n)--.

UNITED STATES PATENT AND TRADEMARK OFFICE
CERTIFICATE OF CORRECTION

PATENT NO. : 5,177,795
DATED : January 5, 1993
INVENTOR(S) : HIROSHI TANIOKA, ET AL.

It is certified that error appears in the above-identified patent and that said Letters Patent is hereby corrected as shown below:

COLUMN 14

Line 15, "N-bit" should read --m-bit--.
Line 46, "data" should be deleted.

COLUMN 16

Line 16, "discrimination" should read --discriminating--.
Line 39, "tion" should read --ting--.
Line 61, "the" should be deleted.

COLUMN 18

Line 22, "output of" should read --output data of--.
Line 31, "discrimination" should read --discriminating--.

Signed and Sealed this

Fifth Day of April, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,177,795
DATED : January 5, 1993
INVENTOR(S) : Hiroshi Tanioka, et al It is certified that error appears in the above-indentified patent and that said Letters Patent is hereby corrected as shown below:

COLUMN 17

Line 16, "claim 22, " should read --claim 23,--.

Signed and Sealed this

Twenty-fourth Day of May, 1994

Attest:

BRUCE LEHMAN

Attesting Officer       Commissioner of Patents and Trademarks